United States Patent
Rickenbacher

(10) Patent No.: US 10,338,573 B2
(45) Date of Patent: Jul. 2, 2019

(54) MULTIPLE DYNAMIC JOB SEQUENCE

(71) Applicant: Mueller Martini Holding AG, Hergiswil (CH)

(72) Inventor: Mark Rickenbacher, Sissach (CH)

(73) Assignee: MUELLER MARTINI HOLDING AG, Hergiswil (CH)

( * ) Notice: Subject to any disclaimer, the term of this patent is extended or adjusted under 35 U.S.C. 154(b) by 17 days.

(21) Appl. No.: 15/598,347

(22) Filed: May 18, 2017

(65) Prior Publication Data

US 2017/0336783 A1   Nov. 23, 2017

(30) Foreign Application Priority Data

May 19, 2016   (CH) .................................... 00648/16

(51) Int. Cl.
*G06F 3/12*   (2006.01)
*G05B 19/418*   (2006.01)
*B41F 33/00*   (2006.01)
*B41F 33/16*   (2006.01)

(52) U.S. Cl.
CPC .... *G05B 19/41865* (2013.01); *B41F 33/0009* (2013.01); *B41F 33/16* (2013.01); *B41P 2233/10* (2013.01); *G05B 2219/34379* (2013.01)

(58) Field of Classification Search
None
See application file for complete search history.

(56) References Cited

U.S. PATENT DOCUMENTS

| | | | |
|---|---|---|---|
| 5,479,343 A * | 12/1995 | Matoba | G06Q 10/06 700/106 |
| 5,918,226 A * | 6/1999 | Tarumi | G06Q 10/10 |
| 9,423,989 B2 * | 8/2016 | Rai | G06Q 10/06 |
| 2001/0039461 A1 | 11/2001 | Bauer | |
| 2011/0066269 A1 * | 3/2011 | Zhou | G05B 19/41865 700/101 |
| 2013/0069566 A1 | 3/2013 | Pietromonaco | |

(Continued)

FOREIGN PATENT DOCUMENTS

DE   10055583 A1   6/2001
EP   2135740 A2   12/2009

(Continued)

*Primary Examiner* — Dung D Tran
(74) *Attorney, Agent, or Firm* — Leydig, Voit & Mayer, Ltd.

(57) ABSTRACT

A method for operating a system for a multiple dynamic job sequence includes providing a packet of information in order to process different production runs. An additional packet of information is used to inquire about respective states during the manufacturing process so as to enable interventions to be made based on the jobs being not processed as originally. An additional packet of information is received, from which information regarding physical detection of a printing and processing situation is taken such that each downstream processing machine is able to identify the job and a job end. By identifying the job and the job end, an additional packet of information is forwarded to the plant controller, the plant controller detecting an actual state of the manufacturing process therefrom such that new or adapted job sequences and job ends are directly defined during the manufacturing process.

19 Claims, 1 Drawing Sheet

(56) References Cited

U.S. PATENT DOCUMENTS

2013/0235425 A1*  9/2013  Abegglen ............... B42C 19/02
                                                358/1.15
2016/0107434 A1   4/2016  Bracher et al.
2016/0209819 A1*  7/2016  Cudak .................... G05B 15/02

FOREIGN PATENT DOCUMENTS

| EP | 2636536 A1 | 9/2013 |
| EP | 2759045 A2 | 7/2014 |
| EP | 3009267 A1 | 4/2016 |

* cited by examiner

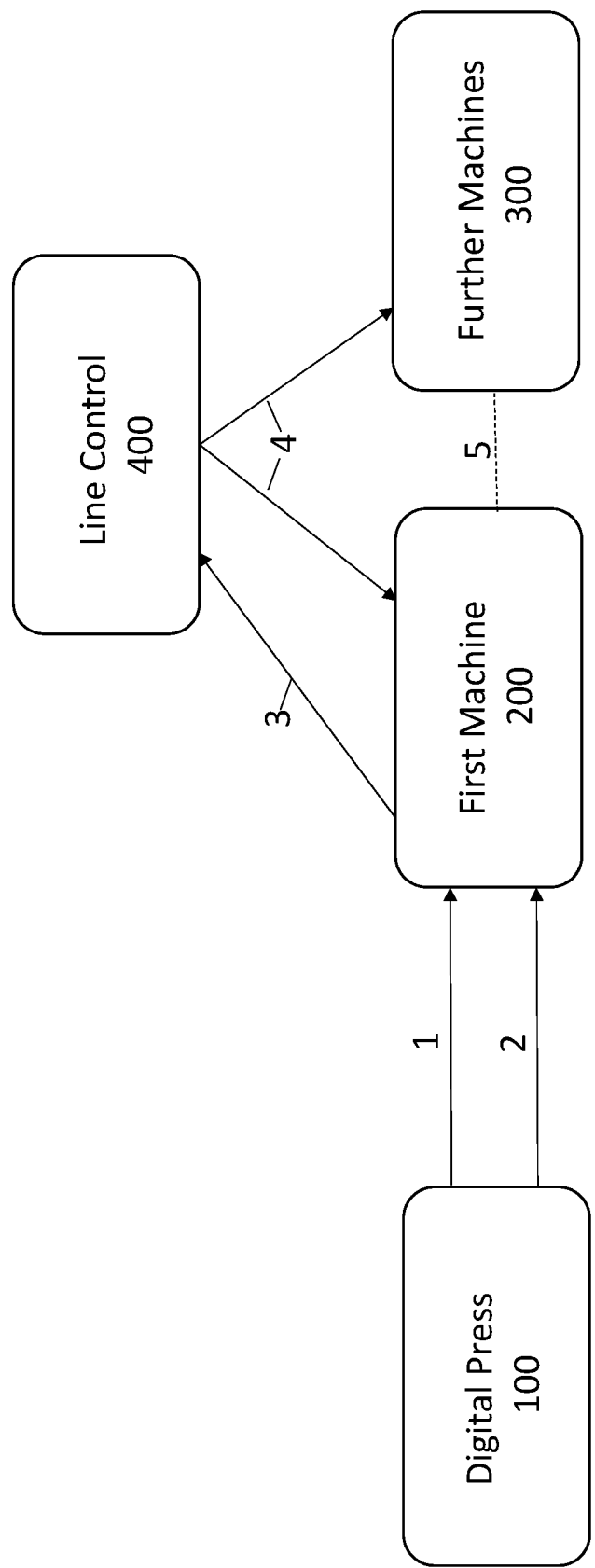

MULTIPLE DYNAMIC JOB SEQUENCE

CROSS-REFERENCE TO PRIOR APPLICATION

Priority is claimed to Swiss Patent Application No. CH 00648/16, filed on May 19, 2016, the entire disclosure of which is hereby incorporated by reference herein.

FIELD

The invention relates to ensuring the simultaneous production of a plurality of jobs (multijobs) in a system in respect of the job sequence and the job run. A job run can consist of recording the job end or even only partial jobs.

BACKGROUND

EP2636536 A1 discloses that the point at which a last section of a first manufacturing job processed in the manufacturing plant has left a print converter of the manufacturing plant is first determined. The particular machine controller relays to the plant controller that the print converter is ready to be changed over to the next manufacturing job. The plant controller then communicates the change-over instructions to the particular machine controller. This print converter is either fully automatically or partially automatically changed over according to the sections of the next manufacturing job that are to be processed in the manufacturing plant.

In this case, the point at which said print converter has finished being changed over is determined. The machine controller then relays the completion of the change-over process to the plant controller. This print converting line can now be loaded with the sections of the next manufacturing job, in particular directly after the change-over.

EP2759045 A2 discloses a printing system which makes it possible to obtain information relating to the internal processes when producing and converting printed products. In particular, stop positions are precisely known; the printing system always knows which printed sheets have been completely or incompletely printed. Likewise, additional organizational information is also known or can be directly obtained.

SUMMARY

In an embodiment, the present invention provides a method for operating a system for a multiple dynamic job sequence, the system comprising at least one press, at least one downstream processing machine and a plant controller, by which at least one packet of information is provided. The plant controller provides the packet of information in order to process different production runs such that jobs are tracked continuously and in a capillary manner during an entire manufacturing process. The plant controller uses an additional packet of information to either continuously or intermittently inquire about respective states during the manufacturing process so as to enable, by the additional packet of information, interventions to be made based on the jobs being not processed as originally planned for any reason. The plant controller continuously or intermittently feeds an additional packet of information to the at least one press and the at least one first downstream processing machine so as to prevent interruptions during processing the jobs. The system receives an additional packet of information, from which information regarding physical detection of a printing and processing situation is taken such that each of the at least one downstream processing machine is able to identify the job and a job end either individually or together with at least one additional processing machine. By identifying the job and the job end, an additional packet of information is forwarded to the plant controller, the plant controller detecting an actual state of the manufacturing process therefrom such that new or adapted job sequences and job ends are directly defined during the manufacturing process.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 is a schematic view of the system for physically detecting the printing situation and the subsequent interventions in the processing machines that are triggered as a result.

DETAILED DESCRIPTION

One embodiment of the invention relates to the possibility of dividing the print converter of the manufacturing plant into segments and/or forming a segment from at least one print converter. In this case, a segment is changed over as soon as the last section of a manufacturing job has left this segment. The flexible and modular division of the manufacturing plant into segments is advantageous in that the segments in the form of portions of the manufacturing plant can be changed over according to the subsequent manufacturing job.

One embodiment of the invention makes data (information relating to the internal processes when producing and converting printed products, stop positions, which printed sheets have been completely or incompletely printed, additional organizational information) present in the printing system accessible for the conversion at a suitable time and in a substantively accurate manner.

For this purpose, a method is proposed for recording and transferring organizational data before and/or during a printing process when producing printed products in a press, which is preferably a digital press, this data being recorded at least on the basis of distinguishing features, referred to as a printed mark in the following, that are operatively connected to at least one printed product, the data resulting from the printed mark being transferred and/or transmitted to at least one processing unit that is connected downstream of the printing process. During the integral printing process, a first data determination is carried out, which data are used for at least one redundant check of the data taken from the printed mark.

In this case, it should be taken into account that such a printed mark, which preferably relates to a codification, is associated with at least one printed product. This printed mark, which contains product-related data as intended, ensures that information that is vital for the conversion of the printed products is provided. Printed marks having product-related data comprise, inter alia, information relating to a cross-cutter controller by means of crop marks or by means of a book separation by means of separation marks. Of course printed marks can also record other product-related data. According to an embodiment of the invention, during the printing process the product-based data taken from the printed marks is accordingly redundantly checked at least once with the aim of ascertaining the extent to which this data corresponds to the actual data recorded or determined from the printing process.

According to an embodiment of the invention, this first involves a redundant check, bearing in mind that before or during the printing process product-related interferences can at least occur, which interferences can no longer be recorded and reproduced by the printed mark. The invention also relates to checking the qualitative properties that are dependent on the printing process and that cannot be recorded by the printed marks.

If such a check is consequently not carried out, there is always the immanent risk of incorrect conclusions being made when converting the printed products, since the data from the printed marks no longer correspond to, or at least differ at points from, the actual state of the printed product during the printing process, or the printed product loses quality during the printing process, it not being possible for this loss in quality to be anticipated by the printed marks.

With reference to EP3009267 A1, an embodiment of the invention relates to the provision a method for producing printed products in a manufacturing plant which is equipped with a digital press and at least one converter arranged downstream of the digital press, in which, during the phase of changing the manufacturing plant over for successive manufacturing jobs, i.e. when changing jobs, both the manufacturing time and the material consumption are minimized. In this case, a time period for adjusting the converter of the manufacturing plant is determined, this converter requiring the longest adjustment time. At least one converter begins with the adjustment as soon as the last printed product of the preceding manufacturing job has left said converter. Once the adjustment has begun, a converter to be adjusted then begins with processing the subsequent manufacturing job as soon as the time period determined for adjusting the converter which requires the longest adjustment time has elapsed. This ensures that all the components of the manufacturing plant that are upstream of the converter which requires the longest adjustment time already process the subsequent manufacturing job during the adjustment process of said converter, and the printing substrate web or the printed products reaches or reach said converter immediately after it has been adjusted. In contrast with the prior art, this therefore reduces the amount of non-usable printing substrate web and shortens the manufacturing time.

An embodiment of the invention provides a solution in this case to ensure the simultaneous production of a plurality of jobs in a multijob system, bearing in mind that the job sequence or job run is or cannot necessarily be assumed to be the sequence or job run originally determined, but that the planned printing sequence has or is to be situationally adapted due to internal or external factors and/or occurring events, it also being possible for cases to occur in which said planned printing sequence does not necessarily have to be adapted, but can be adapted merely optionally from case to case. These interventions are carried out and implemented in particular when the original printing process is carried out using a digital printing system. An embodiment of the invention provides that the original definition of the job sequence and the job run cannot be assumed because the actual printing sequence can constantly change in relation to the planned sequence, particularly as a result of using a digital printing system, for example when:

- the controlled provision of the printing data can last for different lengths of time for each job;
- the variable of the subsequent printing runs (printing amounts) can vary considerably from one another;
- for example termination instructions are given from the operation of the downstream processing machine; and
- during the printing operation, instructions are given which relate to superposed run changes or to printing finishing early.

An embodiment of the invention therefore ensures that such inconsistencies during the conversion process can be dynamically controlled so that it is still possible to ensure simultaneous conversion of a plurality of jobs, i.e. without providing measures which affect the continuous printing operation or which could negatively influence said printing operation.

In this case, it needs to be ensured that the printing operation that has actually taken place is directly detected in good time, in which this is or can preferably be a physical detection (barcode reading) on the paper, which can be easily detected by the software used.

This detection is arranged directly downstream of the digital printing, i.e. operatively connected at least to a first processing machine.

Furthermore, an embodiment of the invention provides that this detection is supplemented with further information (additional information), which provides information about the internal printing situation, by the actual printing operation that has taken place. This additional information contains all the relevant product-related characteristics, such as job end, state of the product, etc.

As a result, the simultaneous production of a plurality of jobs in a multijob system requires a clear definition of the job sequence and the job run (job end). In particular, the integration of external digital printing systems shows that the original definition of the job sequence and the job run cannot or can no longer be assumed. The actual printing sequence thus changes in relation to the planned sequence if, for example, a different amount of time is required for processing the printing data for each job, or if, for example, an instruction given by a production line is ignored or should be ignored in an integrated external system.

In such cases, the variable of the printing run and therefore the job end can no longer be determined beforehand with the required reliability, particularly when instructions have an effect on the run change or early printing termination.

The chosen approach according to an embodiment of the invention for solving the problem is substantially oriented to ensuring the physical detection of the printing situation on the paper by means of the first machine during the conversion process, which machine is adjacent to the digital printing system. In addition, the printing system sends additional information regarding the actual printing situation via a further interface. The first machine in the conversion process identifies the job and the job end and passes the information on to the plant controller. Said controller detects the situation and the measures to be taken with regard to the job sequence and the job end on the basis of all the additional system participants involved in the conversion process.

An actually predetermined printing sequence can accordingly always change when certain events happen, in which the system is able to trigger control measures which are either attributed to control profiles or can be intercepted by simultaneous control interventions, specifically:

a) the physical identification of the job and job end is initially based on a barcode reading. The job is determined using an identification number in the barcode and is identified by the plant controller (software).

b) reading in a new job identification then specifies the sequence, this reading-in simultaneously representing the latest possible job end of the preceding job.

c) additional information relating to the printing situation (in addition to recording the barcode) is preferably conveyed via a bus system (machine interface). Here, the printing system initially sends relevant information such as job end, production sequence(s), state of the products, etc. to the first processing machine, which forwards the further information.

d) the controlled provision of the print data for each job is characterized by different lengths of time, this length of time not always being a variable that is determined in advance, but can readily result from the printing operation, this printing operation then also being operatively connected to the downstream processing machines;

e) the variable of the subsequent printing runs (printing amounts) to be converted vary considerably from one another either from the start or during the course of the printing operation;

f) for example, termination instructions are given from the operation of the downstream processing machine;

g) instructions are given during the printing operation which bring about simultaneous superposed run changes;

h) Signals or instructions can be given from the printing operation or the downstream processing machines, which, in extreme cases, calls for printing to finish early, either as a matter of urgency or as a precaution.

i) The plant controller is then designed such that printing approval is not given for the planned job due to a superordinate analysis of all the incoming information, and therefore the job is not printed. In this case, an injected job is then not terminated in a manner that is stored in some way either, but it is just not produced at all in the first place. This is the case for example if the plant controller determines from the incoming information that the requirements for a multiple dynamic job sequence are no longer met or can no longer be ensured for physical and/or production reasons, or if the risk management software integrated in the plant controller comes to the same conclusion to not continue such a print production.

An embodiment of the invention thus ensures that such inconsistencies and imponderables during the printing process or during downstream conversion can be dynamically controlled so that it is still possible to ensure simultaneous processing of a plurality of jobs, i.e. without therefore providing measures that could have a limiting effect on the continuous printing operation. The jobs are therefore intended to no longer have to be processed one after the other on the basis of a timeline, but can also be processed at the same time.

Such a procedure that allows for a maximized degree of production freedom can only be ensured when early or direct reliable detection by the actual printing processes taking place and the state during the processing sequences can take place.

For safety reasons, a physical detection (barcode reading) on the paper, which is unambiguously carried out by the software used, is preferably paramount and triggers instructions in a targeted manner that can no longer be superposed by interferences. However, this does not mean that these interferences are no longer intended to have a status, but, depending on their importance, they can first be parked and retrieved in the next cycle either in a targeted manner or when needed.

This barcode-dependent detection, which is preferably arranged directly downstream of the digital printing, therefore obtains an important function insofar as it is also practically possible to incorporate the immediately following first processing machine by means of these instructions, whereby not only the printing process is covered, but this first processing machine also allows for a connection, i.e. in the form of a bridge, to be established in order to operate the subsequent processing machines, whereby the continuous operation of a plurality of jobs can be better covered.

In other words, with regard to detecting the jobs, the printing process and conversions then form one unit devoid of interfaces.

If such a strategy is pursued throughout, further detections can easily be determined from the printing process and conversions, which can then provide additional information, for example relating to the product-related actual characteristics of each individual printing job, the state of the individual jobs, etc. In particular, information relating to how the job ends behave with respect to one another with regard to the individual printing jobs can then also be obtained therefrom.

This means that the selected processing machine, which is arranged directly downstream of the digital printing, is simultaneously fed a dual information flow. This information then flows into a plant controller, which integrates all the converters in terms of control, and is provided with a ribbon cable that ensures a status message, at least regarding the respective states, that is based on the job sequence of the products. The plant controller is designed such that the status message contains a clear message.

Another advantage of the invention can be considered that of directly modifying the job sequence in the press by means of the solutions shown; furthermore, the converters acting downstream of the press undergo an operating adaptation, which also has a direct effect, such that there are no more misprinted sheets and no more fail-sheet stoppages.

FIG. 1 schematically shows the interdependence between the different processing machines 100, 200, 300 and a central control unit (plant controller) 400.

The control lines 1-5 carry out the following functions when operatively connected to the above-mentioned processing machines and the plant controller:

Position 1 represents the physical identification of the job and the job end on the basis of a barcode reading. The job is determined on the basis of an identification number in the barcode and is identified in the plant controller. The reading of a new identification specifies the sequence and simultaneously corresponds to the latest possible job end of the preceding job.

Position 2 represents conveying additional information for the actual printing situation via a bus system. The printing system 100 sends relevant information such as the job end, product sequence and the state of the product. The above-mentioned additional information should be understood as being information that is stored globally or individually and can accordingly be directly activated when necessary.

Position 3 can be understood as being the definition of the job sequence and run to which the machine interfaces (bus system) relate. By means of a request or enquiry injected by the plant controller, job-related product information is provided in the system. These requests or enquiries can be situationally controlled or predicted according to specific logarithms stored in the plant controller.

Position 4 can be understood as being the definition of the product and the job sequence to which the machine interfaces (bus system) relate. This information is directed to individual processing machines or to all the processing machines of the system. This information can be introduced either simultaneously and/or in succession.

Position 5 intends to represent possible intercommunication between the individual processing machines, it being possible for a redundant check to be provided by means of the plant controller 400.

A method that relates to the operation of a press, preferably a digital press, which is directly operatively connected to further downstream print converting machines, is therefore paramount in this case.

A plant controller ensures that different manufacturing jobs can be processed, and specifically so that sections or finished products (jobs) can be tracked continuously and in a capillary manner during the entire production process, and specifically interventions can be made not only so as to inquire about the respective states, but also such that said interventions are continuously possible, when the jobs cannot be carried out as originally planned for any reason.

So that print conversion process is therefore not limited by interruptions, both the press and at least the first converter is fed corresponding information by the plant controller in a continuous manner, i.e. not only at certain points.

The implementation of this approach for solving the problem therefore firstly relates to the physical detection of the printing situation, preferably by means of the first machine during the conversion process, which first machine is directly adjacent to the digital printing system and can therefore be fed a first packet of information by said digital printing system.

At the same time, the printing system provides additional information relating to the printing situation via a second packet of information, which information could not be covered by the first physical detection. The claimed machine is therefore able to identify the job and the job end, whereupon this information is passed on to the plant controller. Said plant controller initially detects the actual state present and then directly defines the optimum job sequence and the job end for all the additional systems during the converting.

following criteria in principle still need to be taken into account:
1) the controlled provision of the print data for each job is characterized by different lengths of time, this length of time not always being a variable determined in advance, but can readily result from the printing operation, this printing operation then also being operatively connected to the downstream processing machines.
2) The variables of the subsequent printing runs (printing amounts) to be processed can vary considerably from one another either from the start or during the printing operation.
3) For example, termination instructions can be given from the operation of the downstream processing machine.
4) During the printing operation, instructions are given which simultaneously or almost simultaneously allow for superposed run changes.
5) Signals or instructions from the printing operation or the downstream processing machines can be given, which call for printing to finish early, either as a matter of urgency or as a precaution While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for operating a system for a multiple dynamic job sequence, the system comprising at least one press, at least one downstream processing machine and a plant controller, the method comprising:

providing, by the plant controller, production information, which corresponds to a definition of a job sequence of the multiple dynamic job sequence, in order to process different production runs such that jobs of the multiple dynamic job sequence are tracked continuously and in a capillary manner during an entire manufacturing process;

continuously or intermittently inquiring, by the plant controller, about respective states during the manufacturing process so as to enable interventions to be made based on the jobs not being processed as originally planned for any reason;

providing, continuously or intermittently by the plant controller, additional production information, which corresponds to current manufacturing process information, to the at least one press and the at least one first downstream processing machine so as to prevent interruptions during processing the jobs;

receiving identification information, corresponding to a physical detection of a printing and processing situation, the identification information being for each of the at least one downstream processing machine to identify a job and a job end of the multiple dynamic job sequence either individually or together with at least one additional processing machine; and by identifying the job and the job end, forwarding state information to the plant controller, the plant controller detecting an actual state of the manufacturing process therefrom such that new or adapted job sequences and job ends of the multiple dynamic job sequence are directly defined during the manufacturing process, wherein the system provides simultaneous production of the jobs of the multiple dynamic job sequence independent from the multiple dynamic job sequence originally determined in such a way that the jobs have or are to be situationally adapted to internal factors or external factors and/or occurring events.

2. The method according to claim 1, wherein the plant controller determines not to give printing approval for a planned job of the multiple dynamic job sequence based on a superordinate analysis of incoming information, which includes the state information and the identification information.

3. The method according to claim 2, wherein the printing approval is not given based on the plant controller ascertaining from the incoming information that requirements for the multiple dynamic job sequence are no longer met or no longer ensured for physical and/or production reasons, or if risk management software integrated in the plant controller comes to a same conclusion to not continue such a print production.

4. The method according to claim 1, wherein operation of a first processing machine represents an information bridge to the operation of subsequent processing stations.

5. The method according to claim 1, wherein the at least one downstream processing machine, which is arranged downstream of the at least one press, is simultaneously fed a dual packet of information corresponding to the identification information and the current manufacturing process information, the dual packet of information then flowing into the plant controller, the plant controller integrating control of the at least one press and the at least one downstream processing machine based on the dual packet of information.

6. The method according to claim 5, wherein the plant controller is coupled to a ribbon cable, by the state information is fed back to the plant controller on a basis of the job sequence.

7. The method according to claim 1, wherein identification of the job and the job end is determined by a barcode reading and is identified by the plant controller.

8. The method according to claim 1, wherein reading in of a new job identification specifies the sequence, the reading in simultaneously representing a latest possible job end of a preceding job.

9. The method according to claim 1, wherein the plant controller is operated by stored, situational, predictive control profiles.

10. The method according to claim 1, wherein the additional production information being determined by the plant controller based upon at least one of the state information and the identification information.

11. A method for operating a system for a multiple dynamic job sequence, wherein the system comprises at least one press, at least one downstream processing machine, a plant controller, and a plurality of control lines by which information is provided, wherein:

a first control line of the control lines provides identification information that identifies a job and a job end of the multiple dynamic job sequence based on physical barcode readings, wherein the job is determined using an identification number in the barcode and is identified in the plant controller, and wherein reading of a new identification number specifies a new job sequence of the multiple dynamic job sequence, taking into account a latest possible job end of a preceding job of the multiple dynamic job sequence;

a second control line of the control lines that conveys printing information relating to an actual printing situation, wherein the at least one press sends at least part of the printing information comprising a product sequence and a state of the product, wherein the printing information is stored either globally or individually and is directly activated;

a third control line of the control line provides a job definition of the job sequence and run to which machine interfaces relate, wherein, by a request provided by the plant controller, job-related product information is provided in the system, and wherein the jobs are either situationally controlled or predicted according to specific control profiles stored in the plant controller;

a fourth control line of the control lines provides a product definition of the product and the job sequence to the machine interfaces relate, wherein one or more of the at least one processing machine of the system carry out state detection to determine state information, and wherein the state information from the state detection is forwarded simultaneously or successively; and a fifth control line of the control lines that maintains intercommunication between the individual processing machines, the intercommunication being further is-maintained via a further control line wherein whereby the plant controller carries out a redundant check, wherein the system provides simultaneous production of the jobs of the multiple dynamic job sequence independent from the multiple dynamic job sequence originally determined in such a way that the jobs have or are to be situationally adapted to internal factors or external factors and/or occurring events.

12. The method according to claim 11, wherein the plant controller determines not to give printing approval for a planned job of the multiple dynamic job sequence due to a superordinate analysis of incoming information, which includes the identification information and the state information.

13. The method according to claim 12, wherein the printing approval is not given based on the plant controller ascertaining from the incoming information that requirements for the multiple dynamic job sequence are no longer met or no longer ensured for physical and/or production reasons, or if risk management software integrated in the plant controller comes to a same conclusion to not continue such a print production.

14. The method according to claim 11, wherein operation of a first processing machine represents an information bridge to the operation of subsequent processing stations.

15. The method according to claim 11, wherein the at least one downstream processing machine, which is arranged downstream of the at least one press, is simultaneously fed a dual packet of information corresponding to the identification information, the dual packet of information then flowing into the plant controller, integrating control of the at least one press and the at least one downstream processing machine based on the dual packet of information.

16. The method according to claim 11, wherein identification of the job and the job end is determined by a barcode reading and is identified by the plant controller.

17. The method according to claim 11, wherein reading in of a new job identification specifies the sequence, the reading in simultaneously representing the latest possible job end of the preceding job.

18. The method according to claim 11, wherein the plant controller is operated by stored, situational, predictive control profiles.

19. The method according to claim 11, wherein the control lines are implemented via a bus system and/or the control lines are implemented as electronic signals.

* * * * *